(No Model.) 2 Sheets—Sheet 1.

H. BORMANN.
CAR OR VEHICLE FOR PLEASURE RAILWAYS, TOBOGGAN SLIDES, &c.

No. 450,659. Patented Apr. 21, 1891.

Witnesses:
Thomas M. Smith
Richard E. Maxwell

Inventor:
Hermann Bormann,
by J. Walter Douglass
att'y.

(No Model.) 2 Sheets—Sheet 2.

H. BORMANN.
CAR OR VEHICLE FOR PLEASURE RAILWAYS, TOBOGGAN SLIDES, &c.

No. 450,659. Patented Apr. 21, 1891.

Witnesses:
Thomas M. Smith.
Richard C. Maxwell.

Inventor:
Hermann Bormann,
by J. Walter Douglass.
Att'ys.

UNITED STATES PATENT OFFICE.

HERMANN BORMANN, OF PHILADELPHIA, PENNSYLVANIA.

CAR OR VEHICLE FOR PLEASURE-RAILWAYS, TOBOGGAN-SLIDES, &c.

SPECIFICATION forming part of Letters Patent No. 450,659, dated April 21, 1891.

Application filed August 28, 1890. Serial No. 363,354. (No model.)

*To all whom it may concern:*

Be it known that I, HERMANN BORMANN, a subject of the Emperor of Germany, but now residing at the city of Philadelphia, in the county of Philadelphia and State of Pennsylvania, have invented certain new and useful Improvements in Cars or Vehicles for Pleasure-Railways, Toboggan-Slides, &c., of which the following is a specification.

My invention relates in general to a car or vehicle provided with mechanism and appliances for automatically engaging and disengaging a positively-driven cable and with appliances or devices adapted to automatically shift or turn the trucks thereof with relation to one another, whereby the car or other vehicle may be permitted to traverse the straight, curved, and undulating courses with an easy gliding movement without fear of being retarded by frictional influences through contact of the wheels with the tracks or of jumping the tracks or retrograding over the courses.

The principal object of my invention is therefore to provide a pleasure-railway car, vehicle, or toboggan with simple, durable, and efficient gripping and steering devices adapted to be automatically actuated to permit of the engagement and disengagement of a positively-driven cable and for directing or guiding the car or other vehicle over the straight, curved, and undulating courses without shock or jar by an easy gliding movement that will be exhilarating to patrons or occupants thereof.

My invention consists of cars mounted on swivel-trucks provided with tongues attached to means contacting with guide-rails conforming to the direction and curvature of the course; and my invention further consists in the construction, arrangement, and combination of parts hereinafter described, and pointed out in the claims.

The nature and characteristic features of my invention will be more fully understood from the following description, taken in connection with the accompanying drawings, forming part hereof, and in which—

Figure 1:
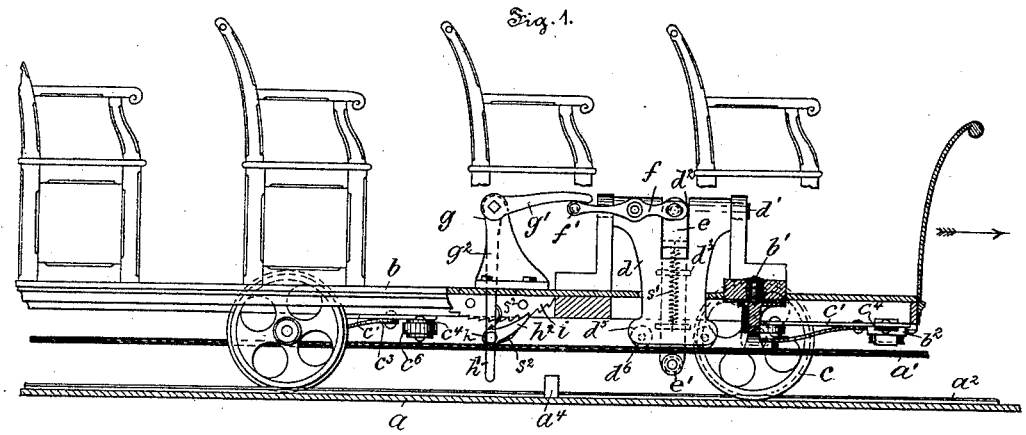
Figure 2:
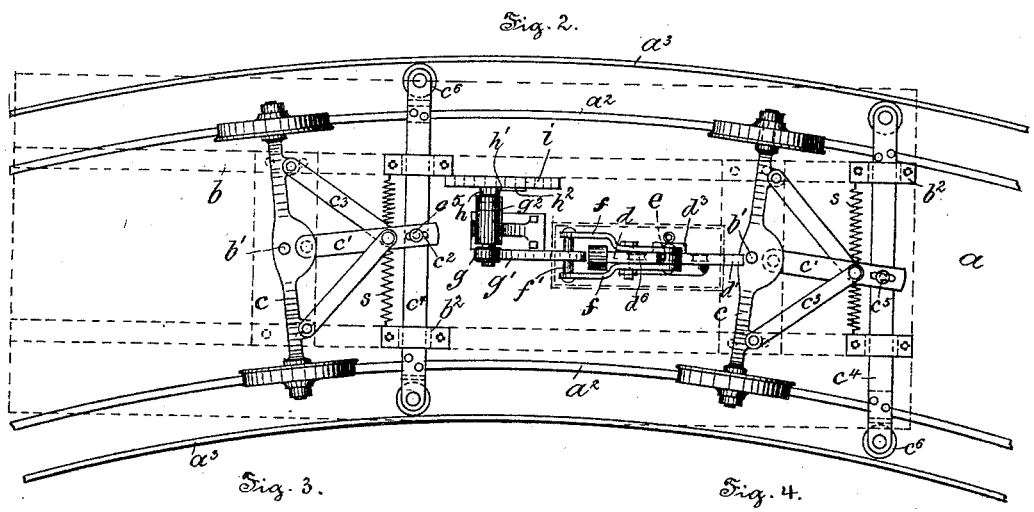
Figure 3:
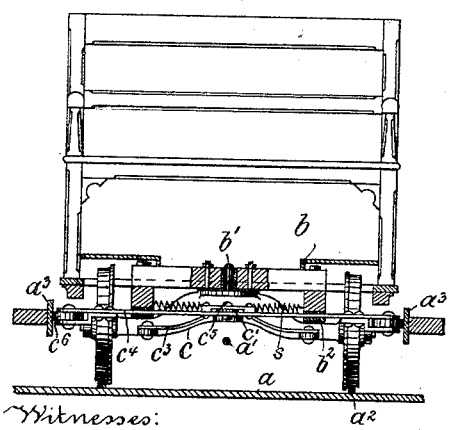
Figure 4:
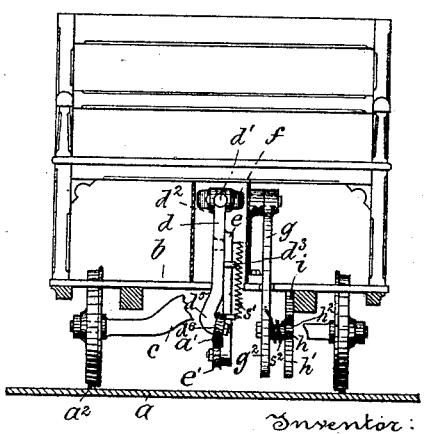
Figure 5:
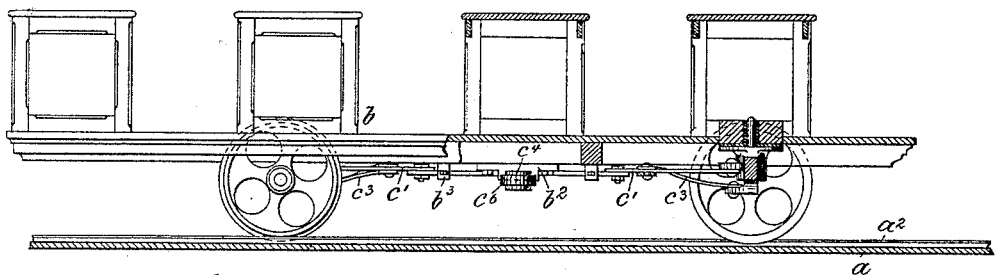
Figure 6:
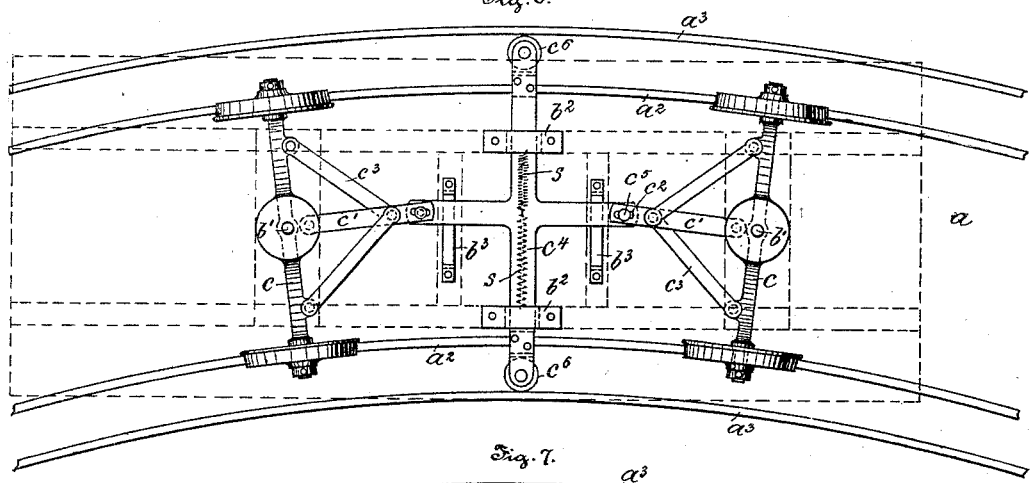
Figure 7:
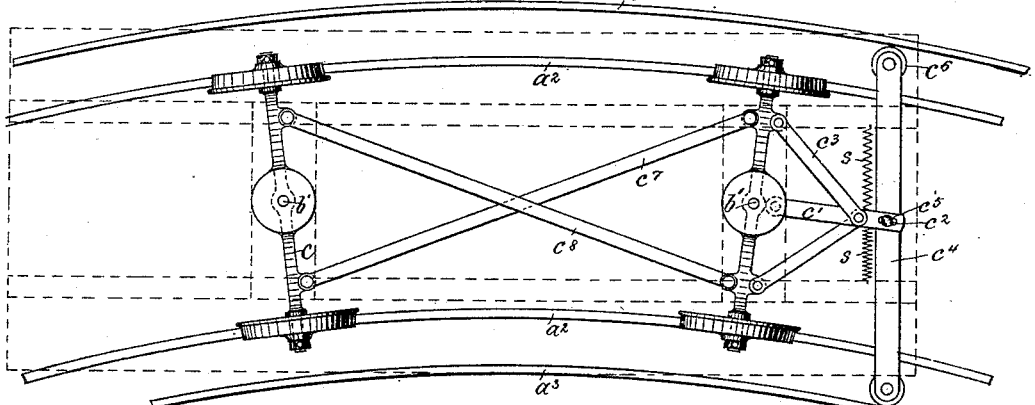

Figure 1 is an elevation of a car embodying features of my invention with the side portions thereof removed to expose to view my improved automatic gripping device, which is shown applied thereto. Fig. 2 is a plan view of the under side of the car, the upper part of the car being removed in order to expose to view my improved running-gear. Fig. 3 is an elevation showing an end view of my improved running-gear. Fig. 4 is a similar view showing an end elevation of the gripping mechanism. Fig. 5 is an elevation of a car adapted to traverse a railway course by gravity with an easy gliding movement, and having one side thereof broken away in order to expose to view the running-gear thereof. Fig. 6 is a plan view of the under side of the car shown in Fig. 5, and Fig. 7 is a similar view of a car provided with a modified form of running-gear.

Referring now to the drawings, $a$ is a portion of a course provided with tracks $a^2$.

$a'$ is a positively-driven cable. The tracks $a^2$ may consist of flanged rails of any preferred cross-section, or they may consist of flat ways. Good results have been attained in practice by employing rails having a square cross-section, and preference is given to such type of rail.

$a^3$ are guide-rails secured to the course $a$ and arranged or disposed parallel to the tracks $a^2$, for a purpose to be hereinafter explained.

$b$ is a car-body provided with seats and mounted on swivel-trucks $c$ by means of king-bolts $b'$.

$c'$ are tongues provided with slots $c^2$, and rigidly connected to the trucks $c$ by means of diagonally-disposed braces $c^3$.

$c^4$ is a shifting bar movably supported in the hangers $b^2$, secured to the under side of the car and attached to the tongues $c'$ by means of a pin $c^5$, engaging in the slot $c^2$.

$c^6$ are rollers journaled to the respective extremities of the shifting bar $c^4$ and adapted to bear against and follow the curvature of the guide-rails $a^3$ when the car is in motion. The movement of the rolls $c^6$ causes the bar $c^4$ to be shifted in its bearings $b^2$ transversely of the car in one direction or the other. This shifting motion of the bar $c^4$ is transmitted by means of the pin $c^5$ and slot $c^2$ to the tongue

$c'$, causing the latter and with it the truck $c$ to turn in one direction or the other about the king-bolt $b'$, thus automatically guiding the direction of motion of the car and causing it to coincide with the direction of the course.

$s$ are spiral or helical springs attached at their respective extremities to the tongue $c'$ and to the lower portion of the car $b$ for insuring a quick and positive return of the truck $c$ to its normal position. Inasmuch as these springs only serve to increase the efficiency of the device, they may, if desired, be omitted; but for the reasons above stated preference is given to their employment.

It will be obvious to those skilled in the art to which my invention relates that one of the guide-rails $a^3$, springs $s$, and rolls $c^6$ may be omitted without the exercise of the inventive faculty, and it is evident that fairly good results may be attained in practice by the employment of such construction; but preference is given to the construction above described.

In Figs. 5 and 6 the tongues $c'$ are arranged toward each other and are attached to the arms of a single shifting bar located between and supported by the bearings $b^2$ and $b^3$ and the trucks $c$, so that the other shifting bar is dispensed with and the apparatus adapted especially for use in connection with cars or toboggans which are not provided with gripping mechanism.

Although the above described running-gear may be employed in connection with any of the well-known types of gripping device, still a description will now be given of an efficient form of automatic gripping device constituting part of my improvements in cars for pleasure-railways.

In the drawings, $d$ is a plate attached to the car $b$ by means of trunnions $d'$ for permitting the plate $d$ to oscillate or swing transversely of the car. This plate $d$ is provided at the top thereof with a recess $d^2$, at one side thereof with brackets or lugs $d^3$, forming ways, and at or near the bottom thereof with an offset portion $d^5$.

$d^6$ are rolls journaled to the offset portion $d^5$ of the plate $d$ and inclined somewhat to the plane of the plate $d$, so as to facilitate the introduction of the cable $a'$ into the grip.

$e$ is a bar adapted to be slid along the face of the plate $d$, and constrained to move in a vertical direction by means of the lugs $d^3$.

$e'$ is a roller journaled to the side and located at or near the lower extremity of the bar $e$. The upper portion $e^2$ of this bar $e$ is offset and fitted into the recess $d^2$, so as to cause the line or stress to coincide with the medial line of the plate $d$, and thereby obviate all bending, twisting, or buckling of the plate $d$.

$s'$ is a helical or spiral spring attached at one extremity thereof to the bar $e$, and at the other extremity thereof to the plate $d$, and tending to draw the bar $e$ downward, so as to separate the rollers and permit the cable $a'$ to run free over the roller $e'$.

$f$ are levers journaled at or near the center thereof to the respective sides of the plate $d$, and pivotally attached at one of the respective extremities thereof to the offset portion $e^2$ of the bar $e$, and at the other of their extremities to a yoke $f'$.

$g$ is a bell-crank lever pivotally attached to the bottom of the car and having one arm $g'$ thereof in sliding contact with the yoke $f'$. The other arm $g^2$ of the lever $g$ is provided with a detent $h$, pivotally attached thereto. One arm $h'$ of this detent occupies normally a position parallel with the arm $g^2$ of the lever $g$. The other arm $h^2$ is adapted to engage with a toothed segmental rack $i$, secured to the under side of the car $b$ in order to retain the lever $h$ in proper position.

$s^2$ is a spring interposed between the lever $g$ and detent $h$ in order to force the arm $h^2$ normally into engagement with the rack $i$.

$a^4$ are projections or blocks attached to the course $a$ and adapted to trip the arms $g^2$ and $h'$ of the levers $g$ and $h$, hereinafter more fully explained.

The mode of operation of the above-described improvements in pleasure-railway cars or vehicles is as follows: In use the positively-driven cable $a'$ is introduced into the grip so as to run over the roller $e'$ and beneath the rollers $d^6$ by permitting the spring $s'$ to depress the roller $e'$, either by tripping the detent $h$ or in any other convenient manner. The inclination of the rollers $e'$ and $d^6$ with reference to each other greatly facilitates the operation of the introduction of the cable, as will be readily understood by reference to Fig. 4. After the cars have been loaded with passengers, or whenever it becomes necessary or desirable, they may be readily attached to the cable $a'$ by pushing the car forward, as indicated by the arrow in Fig. 1, until one of the blocks $a^4$ trips the arm $g^2$ and slightly rotates or turns the lever $g$. The motion of the lever $g$ is transmitted to the sliding bar $e$ by means of the lever $f$, and in overcoming the spring $s'$ draws the roller $e'$ upward between the rollers $d^6$, thus gripping the cable $a'$ and preventing the latter from running freely through the grip. The arm $h^2$ of the detent-lever $h$ is forced by the spring $s^2$ into engagement with the rack $i$ and retains or locks the various parts of the gripping device.

The car may be detached from the cable in order to permit it to descend over portions of the course under the influence of gravity or for any other purpose by tripping the arm $h'$ of the detent-lever $h$, either by means of a block $a^4$, attached to the course, or in any other convenient manner. This movement of the arm $h'$ causes the arm $h^2$ to be withdrawn from the rack $i$ and permits the spring $s'$ to draw the sliding bar $e$ and with it the roll $e'$ downward, thus releasing the cable.

When the car $b$ traverses the course $a$, the rollers $c^6$ bear against the rails $a^3$ and shift the bar $c^4$ transversely of the car, either in one direction or the other. The motion of the respective bars $c^4$ turns the trucks $c$ around the king-bolts $b'$, and thus guides or directs the cars over the straight and curved portions of the course with an easy and gliding motion and without shock or jar.

The construction and mode of operation of the modified form of my invention illustrated in Fig. 7 are the same as above described with reference to Figs. 1 to 6, inclusive, with the following exceptions, that the rear truck is not provided with a tongue and steering mechanism, but is guided from the front truck by means of two diagonally-disposed links or coupling-rods $c^7$ and $c^8$, pivotally attached at the respective extremities thereof to the front and rear trucks. It may be remarked that this apparatus is especially adapted for use in connection with combined straight and curved railway-courses.

It will be obvious to those skilled in the art to which my invention relates that further modifications may be made in the details of constructions and arrangement of the parts thereof without departing from the true spirit of my invention. For example, the rollers $c^6$ may be caused to bear against the rails $a^2$ instead of providing extra rails for such purpose; or, the rollers $c^6$ might be attached directly to the tongues $c'$ instead of to the shifting bars $c^4$, and hence I do not limit myself to the exact construction and arrangements of the parts, as hereinbefore described; but

I claim as new and desire to secure by Letters Patent—

1. The combination, in a railway, of tracks and guide-rails conforming to the direction and curvature thereof, a car provided with trucks linked together and having wheels engaging with said rails, tongues connected with said trucks and provided with transverse arms, and means in engagement with the arms of said tongues adapted to guide and direct said car, substantially as and for the purposes described.

2. The combination, in a railway-course, of tracks and guide-rails located parallel to each other and conforming to the direction and curvature of the course, a car provided with trucks connected together by link connections, and a spring-actuated shifting bar linked to said trucks and provided with guide-rolls, substantially as and for the purposes described.

3. The combination, in a railway, of rails, a car, trucks connected together by diagonal links, a tongue connected with one of said trucks, and means engaging with said tongue and rails, substantially as and for the purposes described.

4. The combination, in a railway, of rails conforming to the direction and curvature thereof, a car, axles provided with wheels and centrally swiveled to said car, tongues attached to said axles, and shifting bars attached to said tongues and contacting with said rails, substantially as and for the purposes described.

5. The combination, in a railway provided with guide-rails conforming to the direction and curvature thereof, of a car mounted on axles provided with traction-wheels and the axles extending transversely of said car centrally swiveled thereto, a shifting bar contacting with said guide-rails, and means for connecting said shifting bar and axles, substantially as and for the purposes described.

6. The combination, in a railway structure or course, of tracks and guide-rails oppositely disposed with relation to each other, a car mounted on trucks provided with wheels adapted to engage with said track-rails, and linked tongues connected with said trucks, and a bar provided with transverse projecting arms having rollers journaled thereto and engaging with said guide-rails, substantially as and for the purposes described.

7. The combination, in a railway, of rails, a car mounted on swivel-trucks, a shifting bar attached to said car by hangers, a tongue secured to one of said trucks and attached to said shifting bar by a slotted connection, and said shifting bar contacting with said rails and moving transversely of said car, substantially as and for the purposes described.

8. The combination, in a railway, of guide-rails, a car, a truck provided with a tongue, a shifting bar contacting with said guide-rails in advance of said truck and attached to said tongue by a slotted connection, and hangers attached to said car for permitting said shifting bar to move transversely thereof, substantially as and for the purposes described.

9. The combination, in a railway, of a guide-rail, a car mounted on a swivel-truck provided with a tongue, springs attached to said car and tongue, a sliding bar contacting with said rail and attached to said tongue by a suitable connection, and means for permitting said bar to move transversely of said car, substantially as and for the purposes described.

10. The combination, in a railway, of a guide-rail, a car mounted on a swivel-truck provided with a tongue, a shifting bar attached to said tongue by a suitable connection and provided with rollers normally contacting with said rail, hangers attached to said car for supporting said shifting bar and adapted to permit of the same moving transversely of the car, substantially as and for the purposes described.

11. The combination, in a railway, of rails, a car or other vehicle provided with front and rear trucks provided with a plurality of wheels and connected together by diagonally-disposed link connections, a shifting bar having transverse projecting arms provided with guide-rolls, and said shifting bar located in advance of the front truck of said car and connected therewith by longitudinal and diagonal link connections, substantially as and for the purposes described.

In witness whereof I have hereunto set my signature in the presence of two subscribing witnesses.

HERMANN BORMANN.

Witnesses:
THOMAS M. SMITH,
RICHARD C. MAXWELL.